United States Patent
Ding et al.

(10) Patent No.: US 10,008,012 B2
(45) Date of Patent: Jun. 26, 2018

(54) IMAGE RECONSTRUCTION

(71) Applicant: Shenyang Neusoft Medical Systems Co., Ltd., Shenyang (CN)

(72) Inventors: Haoda Ding, Shenyang (CN); Hongyu Guo, Shenyang (CN); Hongbing Hu, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 85 days.

(21) Appl. No.: 15/366,719

(22) Filed: Dec. 1, 2016

(65) Prior Publication Data
US 2017/0169586 A1    Jun. 15, 2017

(30) Foreign Application Priority Data
Dec. 11, 2015  (CN) .......................... 2015 1 0920976

(51) Int. Cl.
*G06K 9/00*      (2006.01)
*G06T 11/00*     (2006.01)

(52) U.S. Cl.
CPC .. *G06T 11/003* (2013.01); *G06T 2207/10081* (2013.01); *G06T 2207/10088* (2013.01); *G06T 2207/30004* (2013.01)

(58) Field of Classification Search
CPC . G06T 2207/10081; G06T 2207/10088; G06T 2207/30004; G06T 7/00; G06T 11/003; G06K 9/00
See application file for complete search history.

(56) References Cited

U.S. PATENT DOCUMENTS 7,583,778 B2   9/2009   Mori
8,218,715 B2   7/2012   Sauer et al.
(Continued)

FOREIGN PATENT DOCUMENTS

CN   102105106 A    6/2011
CN   103052972 A1   4/2013
(Continued)

OTHER PUBLICATIONS

Kudo H; Saito T; XP000050532—"A Tomographic Image Reconstruction From Limited View Angle Projection Data," Systems & Computers in Japan, Jul. 1, 1988 Wiley, Hoboken, NJ, US—ISSN 3882-1666; vol. 19, No. 7, pp. 56-64.
(Continued)

*Primary Examiner* — Kim Vu
*Assistant Examiner* — Molly Delaney
(74) *Attorney, Agent, or Firm* — Fish & Richardson P.C.

(57) ABSTRACT

Methods and apparatus, including computer programs encoded on a computer storage medium, for image reconstruction are provided. The methods include: accessing a first set of projection data including a plurality of first projection data each corresponding to a respective projection angle of a plurality of projection angles, generating a first set of reconstructed data by image reconstruction with the first set of projection data, generating a second set of projection data comprising a plurality of second projection data each corresponding to a respective projection angle by projection calculation with the first set of reconstructed data, generating a third set of projection data by optimizing the first set of projection data based on a correlation between respective first projection data and respective second projection data corresponding to each projection angle, and generating a second set of reconstructed data by image reconstruction with the third set of projection data.

20 Claims, 9 Drawing Sheets

(56) References Cited

U.S. PATENT DOCUMENTS

| | | | |
|---|---|---|---|
| 2006/0056578 A1 | 3/2006 | Rubin et al. | |
| 2011/0096971 A1 | 4/2011 | Shechter | |
| 2011/0135182 A1* | 6/2011 | Goto | A61B 6/032 382/131 |
| 2011/0286573 A1 | 11/2011 | Schretter et al. | |
| 2012/0128265 A1 | 5/2012 | Silver et al. | |
| 2013/0051519 A1 | 2/2013 | Yang et al. | |
| 2013/0114871 A1* | 5/2013 | Berkus | A61B 6/5205 382/131 |
| 2015/0103968 A1 | 4/2015 | Chen et al. | |
| 2015/0139526 A1 | 5/2015 | Jeong et al. | |
| 2015/0243045 A1* | 8/2015 | Ra | G06T 7/2033 382/131 |
| 2015/0323474 A1 | 11/2015 | Case et al. | |
| 2015/0356712 A1 | 12/2015 | Stayman et al. | |
| 2016/0371862 A1* | 12/2016 | Silver | G06T 11/008 |

FOREIGN PATENT DOCUMENTS

| | | |
|---|---|---|
| CN | 103136773 A | 6/2013 |
| CN | 103310432 A | 9/2013 |
| CN | 103745488 A | 4/2014 |
| CN | 104167007 A | 11/2014 |
| CN | 104200500 A | 12/2014 |
| CN | 104323789 A | 2/2015 |
| EP | 1531426 A1 | 5/2005 |
| EP | 2720062 A1 | 4/2014 |
| JP | 2010-155020 A | 7/2010 |
| WO | 2004081877 A1 | 9/2004 |
| WO | 2005076221 A1 | 8/2005 |

OTHER PUBLICATIONS

Tasto M; XP001378035—"A Probabilistic Object Model for Computerized Transverse Axial Tomography" Institut of Electrical and Electronics Engineers. Proceedings of the second International joint conference on Pattern recognition; Aug. 13-15, 1974, Copenhagen, Proc. 2, Aug. 13, 1974; pp. 396-397.

XP000520932; Wang G; Vannier M W; "Preliminary Study on Helical CT Algorithms for Patient Motion Estimation and Compensation" IEEE Transactions on Medical Imaging, Jun. 1, 1995 IEEE Service Center, Piscataway, NJ, US—ISSN 0278-0062; vol. 14, No. 2, pp. 205-211.

European Patent Office; European Search Report mailed in corresponding European Patent Application No. 16201077.1 dated May 18, 2017 (9 pages).

State Intellectual Property Office of the People's Republic of China, Office Action and Search Report Issued in Application No. 201510920976.5, dated Oct. 17, 2017, 9 pages (with English-language translation, 13 pages).

State Intellectual Property Office of the People's Republic of China, Office Action Issued in Application No. 201510925600.3, dated Nov. 1, 2017, 9 pages (with English-language translation, 10 pages).

EPO Extended European Search Report for EP App. No. 16202173.7, dated Jun. 1, 2017 (10 pages).

Kudo H; Saito T; "A Tomographic Image Reconstruction From Limited View Angle Projection Data," Systems & Computers in Japan, Jul. 1, 1988 Wiley, Hoboken, NJ, US—ISSN 0882-1666; vol. 19, No. 7, pp. 56-64.

Tasto M; "A Probabilistic Object Model for Computerized Transverse Axial Tomography" Institut of Electrical and Electronics Engineers. Proceedings of the second International joint conference on Pattern recognition; Aug. 13-15, 1974, Copenhagen, Proc. 2, Aug. 13, 1974; pp. 396-397.

Wang G; Vannier M W; "Preliminary Study on Helical CT Algorithms for Patient Motion Estimation and Compensation" IEEE Transactions on Medical Imaging, Jun. 1, 1995 IEEE Service Center, Piscataway, NJ, US—ISSN 0278-0062; vol. 14, No. 2, pp. 205-211.

Zou Jing et al.; A Fast Iterative Image Reconstruction Algorithm from Few-views Progections Data; Acta Optica Sinica, 2009 V29, p. 1198-1204.

Gao Xin et al.; Fast iterative algorithm for image reconstruction from incomplete projections; Journal of Zhejiang University (Engineering Science), 2004 V38, p. 1108-1111.

Yang Min et al.; Three Dimensional Computed Tomography Based on Cone-beam Scanning and Its Engineering Application; CT Theory and Applications 2004 vol. 13.

* cited by examiner

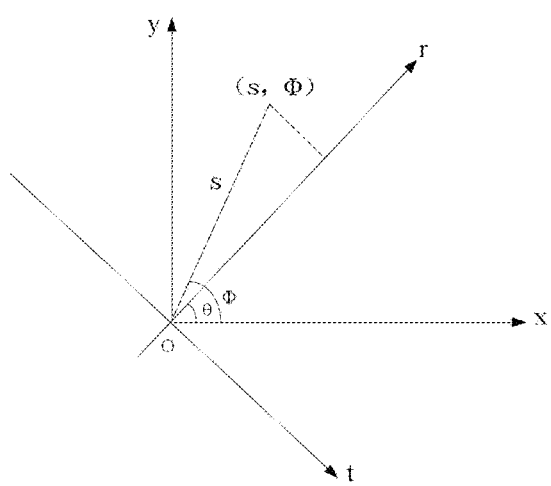
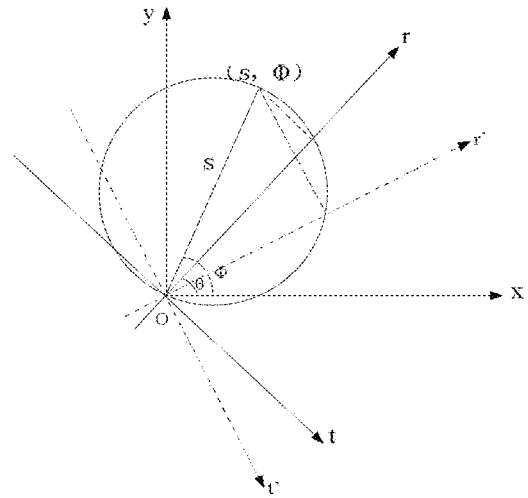
FIG. 1A     FIG. 1B
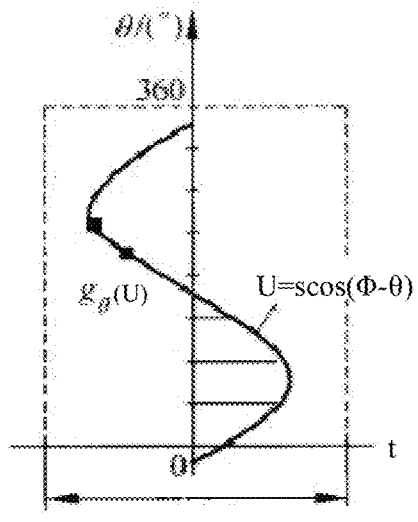
FIG. 1C

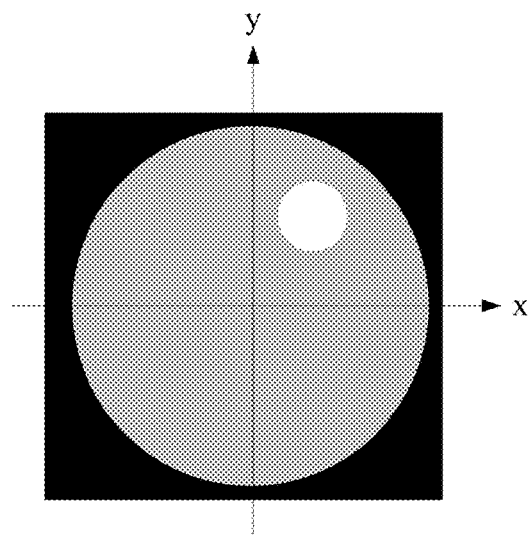
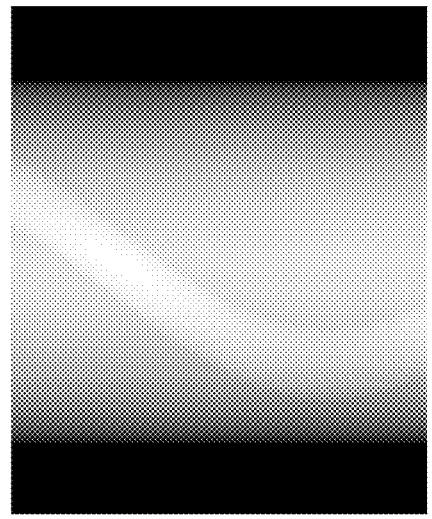
FIG. 2A  FIG. 2B
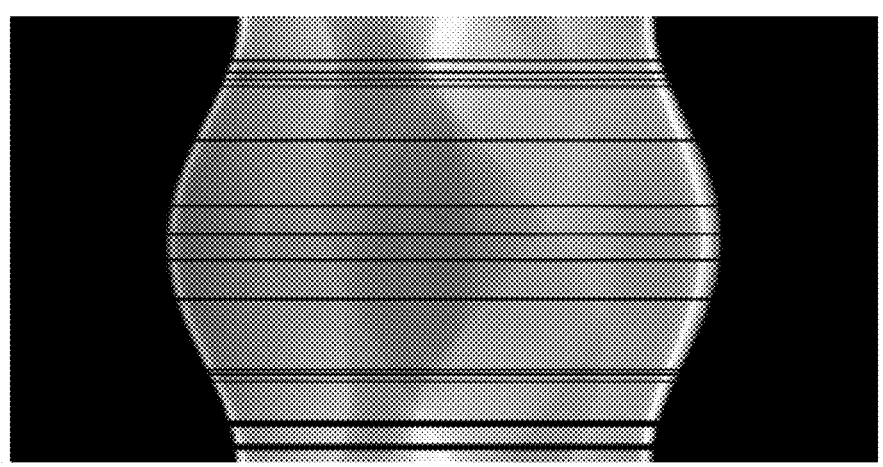
FIG. 3

IMAGE RECONSTRUCTION

CROSS REFERENCE TO RELATED APPLICATIONS

This application claims priority under 35 U.S.C. § 119 to Chinese Patent Application No. 201510920976.5, filed on Dec. 11, 2015. The content of this priority application is hereby incorporated by reference in its entirety.

TECHNICAL FIELD

The present disclosure relates to reconstruction of medical image.

BACKGROUND

In the field of medical imaging, after performing a scanning examination on a patient by a medical device, such as Computed Tomography (CT) or Magnetic Resonance Imaging (MRI) and so on, to obtain scanning data, an image reconstruction may be performed with the scanning data to generate an image to be viewed by doctors.

There are many methods for image reconstruction, such as direct back-projection algorithm, filtered back-projection (FBP) algorithm, and direct Fourier transform algorithm. And in essence, an image reconstruction is performed to obtain pixel values in an image matrix according to gathered projection data so as to reconstruct an image. In the operating procedure of CT or MRI device and so on, the projection data may be missed or damaged due to noise or the like, which may cause streak artifacts to appear on a reconstructed image, and further may have a negative effect on accuracy of diagnosis according to the image.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

One aspect of the present disclosure features a method of reconstructing image, comprising: accessing a first set of projection data that comprises a plurality of first projection data each corresponding to a respective projection angle of a plurality of projection angles; generating a first set of reconstructed data by image reconstruction with the first set of projection data; generating a second set of projection data by projection calculation with the first set of reconstructed data, the second set of projection data comprising a plurality of second projection data each corresponding to a respective projection angle of the plurality of projection angles; generating a third set of projection data by optimizing the first set of projection data based on a correlation between respective first projection data and respective second projection data corresponding to each of the plurality of projection angles; and generating a second set of reconstructed data by image reconstruction with the third set of projection data.

The method can further comprise acquiring the first set of projection data by scanning an object. The method can also further comprise generating a reconstructed image according to the second set of reconstructed data.

In some implementations, generating the third set of projection data comprises: determining a correlation coefficient between respective first projection data and respective second projection data corresponding to each of the plurality of projection angles; in response to determining that a correlation coefficient between first projection data and second projection data corresponding to a projection angle is no greater than a first threshold, taking the second projection data corresponding to the projection angle as projection data corresponding to the projection angle in the third set of projection data; and in response to determining that a correlation coefficient between first projection data and second projection data corresponding to a projection angle is greater than the first threshold, taking the first projection data corresponding to the projection angle as projection data corresponding to the projection angle in the third set of projection data.

In some implementations, generating the third set of projection data comprises: determining a norm between respective first projection data and respective second projection data corresponding to each of the plurality of projection angles; in response to determining that a norm between first projection data and second projection data corresponding to a projection angle is no smaller than a second threshold, taking the second projection data corresponding to the projection angle as projection data corresponding to the projection angle in the third set of projection data; and in response to determining that a norm between first projection data and second projection data corresponding to a projection angle is smaller than the second threshold, taking the first projection data corresponding to the projection angle as projection data corresponding to the projection angle in the third set of projection data.

In some implementations, the method further comprises: determining whether an iterative completion condition is fulfilled; if the iterative completion condition is not fulfilled, taking the second set of reconstructed data as a new first set of reconstructed data and generating a new second set of reconstructed data based on the new first set of reconstructed data; and if the iterative completion condition is fulfilled, generating a reconstructed image according to the second set of reconstructed data. The iterative completion condition can comprise at least one of: a number of iterations reaching a preset value, or a difference between a second set of reconstructed data obtained in a previous iteration and a second set of reconstructed data obtained in a current iteration being no more than a preset value.

Image reconstruction with the first set of projection data can comprise reconstructing image data with the first set of projection data according to at least one of a filtered back-projection algorithm, a direct back-projection algorithm, or a direct Fourier transform algorithm, the reconstructed image data comprising the first set of reconstructed data.

Image reconstruction with the third set of projection data can comprise reconstructing image data with the third set of projection data according to at least one of a filtered back-projection algorithm, a direct back-projection algorithm, or a direct Fourier transform algorithm, the reconstructed image data comprising the second set of reconstructed data.

Another aspect of the present disclosure features an apparatus for reconstructing image, comprising: a processor; and a machine readable storage medium storing machine executable instructions that correspond to a control logic for image reconstruction and upon such execution cause the processor to: access a first set of projection data that comprises a plurality of first projection data each corresponding to a respective projection angle of a plurality of projection angles; generate a first set of reconstructed data by image reconstruction with the first set of projection data; generate a second set of projection data by projection calculation with the first set of reconstructed data, the second set of projection data comprising a plurality of second projection data each corresponding to a respective projection angle of the plurality of projection angles; generate a third set of projection data by optimizing the first set of projection data based on a correlation between respective first projection data and respective second projection data corresponding to each of the plurality of projection angles; and generate a second set of reconstructed data by image reconstruction with the third set of projection data.

The machine executable instructions can further cause the processor to acquire the first set of projection data by scanning an object. The machine executable instructions can further cause the processor to generate a reconstructed image according to the second set of reconstructed data.

In some implementations, the machine-executable instructions cause the processor to generate the third set of projection data by: determining a correlation coefficient between respective first projection data and respective second projection data corresponding to each of the plurality of projection angles; in response to determining that a correlation coefficient between first projection data and second projection data corresponding to a projection angle is no greater than a first threshold, taking the second projection data corresponding to the projection angle as projection data corresponding to the projection angle in the third set of projection data; and in response to determining that a correlation coefficient between first projection data and second projection data corresponding to a projection angle is greater than a first threshold, taking the first projection data corresponding to the projection angle as projection data corresponding to the projection angle in the third set of projection data.

In some implementations, the machine-executable instructions cause the processor to generate the third set of projection data by: determining a norm between respective first projection data and respective second projection data corresponding to each of the plurality of projection angles; in response to determining that a norm between first projection data and second projection data corresponding to a projection angle is no smaller than a second threshold, taking the second projection data corresponding to the projection angle as projection data corresponding to the projection angle in the third set of projection data; in response to determining that a norm between first projection data and second projection data corresponding to a projection angle is smaller than the second threshold, taking the first projection data corresponding to the projection angle as projection data corresponding to the projection angle in the third set of projection data.

In some implementations, the machine executable instructions further cause the processor to: determine whether an iterative completion condition is fulfilled; if the iterative completion condition is not fulfilled, take the second set of reconstructed data as a new first set of reconstructed data and generate a new second set of reconstructed data based on the new first set of reconstructed data; and if the iterative completion condition is fulfilled, generate a reconstructed image according to the second set of reconstructed data. The iterative completion condition can comprise at least one of: a number of iterations reaching a preset value, or a difference between a second set of reconstructed data obtained in a previous iteration and a second set of reconstructed data obtained in a current iteration being no more than a preset value.

The machine executable instructions can cause the processor to perform the image reconstruction on the first set of projection data with at least one of a filtered back-projection algorithm, a direct back-projection algorithm, or a direct Fourier transform algorithm. The machine-executable instructions can also cause the processor to perform the image reconstruction on the third set of projection data with at least one of a filtered back-projection algorithm, a direct back-projection algorithm, or a direct Fourier transform algorithm.

A further aspect of the present disclosure features a non-transitory computer readable storage medium storing instructions that are executable by a processor and upon such execution cause the processor to: access a first set of projection data that comprises a plurality of first projection data each corresponding to a respective projection angle of a plurality of projection angles; generate a first set of reconstructed data by image reconstruction with the first set of projection data; generate a second set of projection data by projection calculation with the first set of reconstructed data, the second set of projection data comprising a plurality of second projection data each corresponding to a respective projection angle of the plurality of projection angles; generate a third set of projection data by optimizing the first set of projection data based on a correlation between respective first projection data and respective second projection data corresponding to each of the plurality of projection angles; and generate a second set of reconstructed data by image reconstruction with the third set of projection data. The machine executable instructions can further cause the processor to generate a reconstructed image according to the second set of reconstructed data.

The details of one or more embodiments of the subject matter described in the present disclosure are set forth in the accompanying drawings and description below. Other features, aspects, and advantages of the subject matter will become apparent from the description, the drawings, and the claims.

BRIEF DESCRIPTION OF DRAWINGS

Features of the present disclosure are illustrated by way of example and not limited in the following figures, in which like numerals indicate like elements.

FIG. 1A is a principle diagram of projection of one point in space at a projection angle.

FIG. 1B is a principle diagram of projection of one point in space at a plurality of projection angles.

FIG. 1C is a schematic diagram of a sine curve formed by projection of one point in space at a plurality of projection angles.

FIGS. 2A and 2B are diagrams of a projection point and a corresponding sine curve.

FIG. 3 is a projection diagram corresponding to brain projection data.

DETAILED DESCRIPTION

Figure 4:
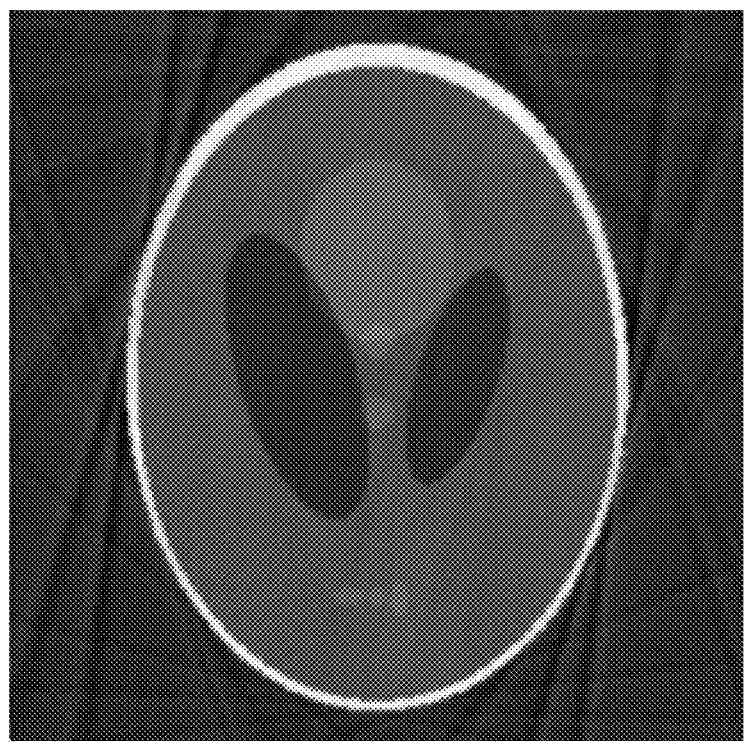
FIG. 4 is an image reconstructed according to the brain projection data of FIG. 3.

First of all, principles of projection and image reconstruction are introduced before introducing a method for processing projection data provided by the present disclosure.

Referring to FIG. 1A, a coordinate system composed of x-axis and y-axis is an image coordinate system, and a coordinate system composed oft-axis and r-axis is a projection coordinate system. The t-axis and straight lines in parallel with the t-axis may denote projection lines, the r-axis may denote a projection plane perpendicular to the projection lines, and an included angle θ between the r-axis and the x-axis may denote a projection angle. A polar coordinate (s, Φ) may be a position of any point in space, s may denote a distance from the point to coordinate origin O, and Φ may denote an included angle between a connecting line from this point to the coordinate origin O and the x-axis. A straight line passing through the point (s, Φ) and perpendicular to the r-axis may denote a projection line passing through the point, and an intersection point of the projection line and the r-axis may be a projection point.

In a process of projecting of the point (s, Φ), the position of the r-axis may also constantly change as the projection angle changes, and the projection line passing through the point (s, Φ) may always be perpendicular to the r-axis. Therefore, referring to FIG. 1B, the position coordinates of the projection points may fall on a circle with a diameter of s. Thus, referring to FIG. 1C, it may be concluded that a connecting line $g_0(U)$ of corresponding projection points of each specific point in continuous 360-degree rotational scanning may be represented by a sine curve, where t represents the field of view, θ represents the projection angle, and $U=s \cos(\Phi-\theta)$ represents the corresponding projection point.

Referring to FIG. 2A, in which black, grey and white colors may be utilized to indicate densities of human body, assuming that black color indicates that the density of human body is 0, grey color indicates that the density of human body is 25, and white color indicates that the density of human body is 50. Supposing that the white point in FIG. 2A denotes a certain nidus of a human body, as illustrated in FIG. 2B, a sine curve may be formed by projection points obtained by irradiation of a projection line rotating 360 degrees.

According to the above principles, a projection diagram of all the projection points may be obtained by projection scanning. FIG. 3 is a projection diagram drawn according to scanned data groups obtained by scanning a simulated brain. The figure may be formed by a plurality of sine curves with horizontal axis as projection data and vertical axis as projection angle. In some cases, CT or a magnetic resonance receiver may generate noise pollution during the running process, or a magnetic resonance transmitter cannot transmit a signal, which may cause missing or damaging of projection data corresponding to a certain or some projection angles, so that a sine condition is not fulfilled. The so-called sine condition means that the projection data may form a sine curve, and not complying with the sine condition means that the projection data are unable to form the sine curve.

FIG. 3 shows a case where some projection data are missing. In the case that the projection data are missing, the density of human body is 0 by default, which are manifested in FIG. 3 as strips of black lines, where one black line represents missing of projection data corresponding to at least one projection angle.

In some implementations, image reconstruction is a process of obtaining an image of a cross section of an object, e.g., human body, by computer processing according to a group of projection data of the cross section. For example, an image reconstruction can be a process of obtaining an image shown in FIG. 2A through a series of calculation based on projection data corresponding to the projection diagram in FIG. 2B. FIG. 4 is an image reconstructed according to a set of projection data obtained by scanning the brain of FIG. 3. As can be seen, missing of projection data corresponding to a certain angle or some projection angles may cause apparent streak artifacts to appear in an image background, with a poor contrast.

Projection data damage means that actually obtained projection data may not comply with the sine condition due to noise pollution. In some cases, strips of black lines shown in FIG. 3 may not appear in a projection diagram, but streak artifacts shown in FIG. 4 may still appear in a reconstructed image obtained according to damaged projection data, probably with a poor contrast.

The present disclosure provides a method and apparatus for image reconstruction to solve the problem that artifact occurs in a reconstructed image due to movement of projection data, e.g., damaged or missing projection data.

Figure 5:
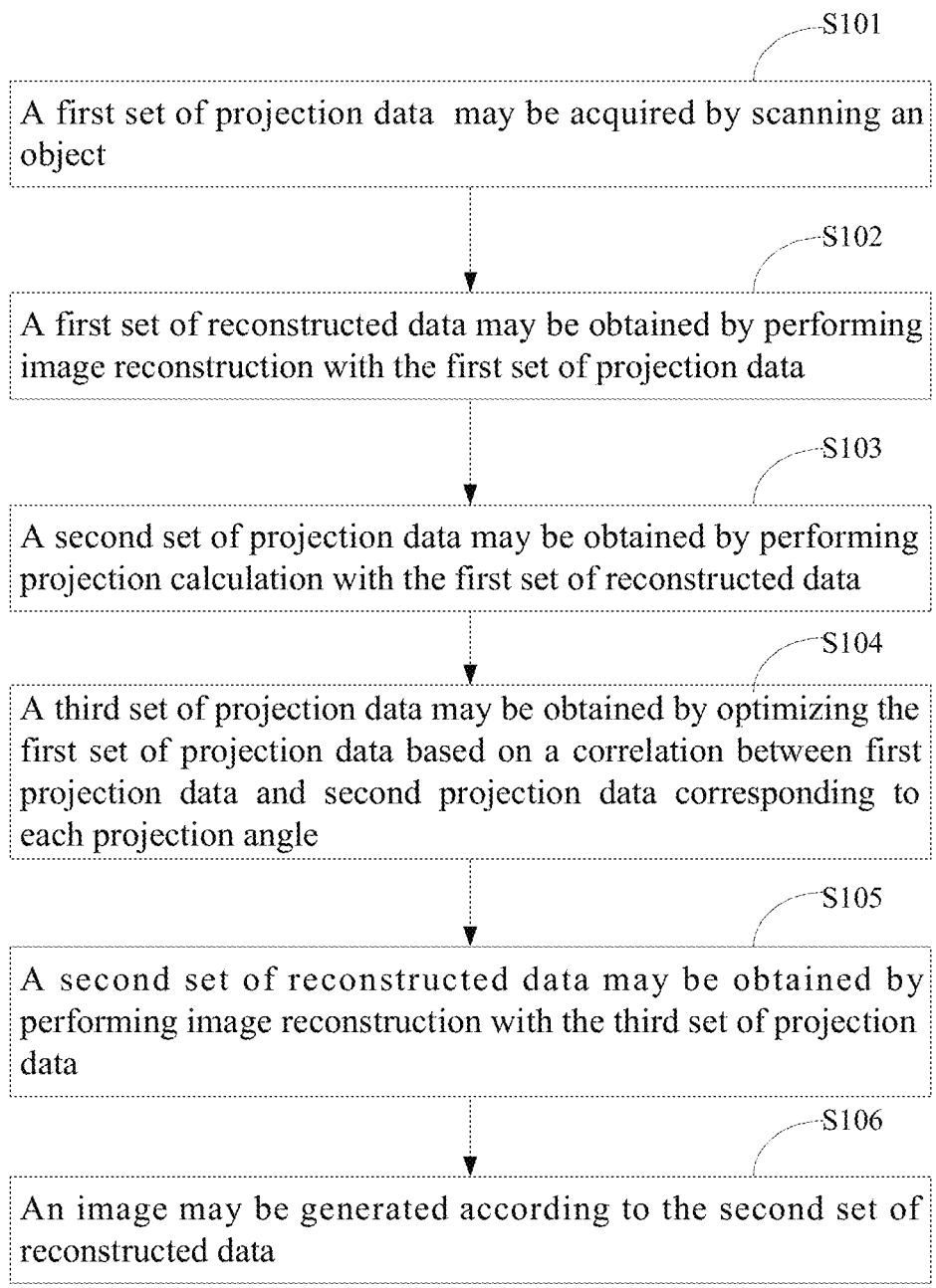
FIG. 5 is a flowchart of an image reconstruction method according to one example of the present disclosure.

FIG. 5 is a flowchart of an image reconstruction method according to one example of the present disclosure. As shown in FIG. 5, the method for image reconstruction provided by this example may include the following blocks S101-S106.

At block S101, a first set of projection data may be acquired by scanning an object. The first set of projection data may include a plurality of first projection data each corresponding to a respective projection angle of a plurality of projection angles. In some cases, for each projection angle of the plurality of projection angles, the first set of projection data includes respective first projection data.

In practical applications, the projection angle may be preset. For example, each degree of 360 degrees may serve as a projection angle. Alternatively, every other degree may serve as a projection angle, for example, 1 degree or 3 degrees, etc. This is not limited in the present disclosure, and the persons skilled in the art may design themselves according to specific conditions.

At block S102, a first set of reconstructed data may be obtained, e.g., generated, by performing image reconstruction on the first set of projection data with one or more image reconstruction algorithms.

In an example, image reconstruction algorithms may include transform algorithms and series expansion algorithms. Direct Fourier transform algorithm, filtered back-projection algorithm and direct back-projection algorithm are three common algorithms for implementing image reconstruction based on projection. All of the three algorithms belong to transform algorithms.

In the following, calculation steps of the filtered back-projection algorithm, of the direct back-projection algorithm, and of the direct Fourier transform algorithm are introduced, respectively.

The calculation steps of the filtered back-projection algorithm may include the following steps. Firstly, supposing that projection data $S_\theta(r)$ is the data corresponding to a projection angle $\theta$ in a projection process, where r denotes a coordinate value in a projection coordinate axis, Fourier transform is performed on the projection data $S_\theta(r)$, namely:

$$F_\theta(R) = FFT(S_\theta(r)) \quad (1).$$

Next, the value of each point $F_\theta(R)$ is multiplied by a respective one-dimensional weighting factor W(R) to get a multiplied value, which may be subjected to an inverse Fourier transform. In this way, revised projection data $S'_\theta(r)$ are obtained, namely:

$$S'_\theta(r) = iFFT(F_\theta(R) \cdot W(R)) \quad (2).$$

Then, a direct back-projection calculation may be performed on the revised projection data $S'_\theta(r)$ to get a back-projection result $b_\theta(x,y)$ with a direct back-projection function as follows:

$$b_\theta(x,y) = \int_{-\infty}^{+\infty} S'_\theta(r) \delta(x \cos \theta + y \sin \theta - r) dr \quad (3),$$

where x represents a row-coordinate of a reconstructed image, y represents a column-coordinate of the reconstructed image, and $\delta(x \cos \theta + y \sin \theta - r)$ is a Dirac delta function of a projection line with a projection angle of $\theta$ and a distance from projection center (namely, an origin of a projection coordinate system) of r.

The foregoing steps can be repeated by changing the projection angle, thus a respective back-projection result $b_\theta(x,y)$ of each projection angle $\theta$ can be obtained. Final reconstructed data M(x,y) may be obtained by summing the back-projection result $b_\theta(x,y)$ of each projection angle $\theta$:

$$M(x,y) = \Sigma_\theta b_\theta(x,y) \quad (4).$$

The filtered back-projection algorithm can have quick reconstruction speed, high space and density resolution and the like. For direct back-projection algorithm, after obtaining projection data, a calculation is conducted directly with a back-projection function, and neither Fourier transform nor inverse Fourier transform is performed on the projection data, namely, the projection data are not revised.

The calculation formula of the direct Fourier transform algorithm may be as below:

$$M(x,y) = \int_{-\infty}^{\infty} \int_{-\infty}^{\infty} F(u,v) e^{j2\pi(ux+vy)} du dv \quad (5),$$

where M(x,y) is the reconstructed data, $F_\theta(R)$ is a Cartesian coordinate representation of F(u,v), $F_\theta(R) = FFT(S_\theta(r))$, and $S_\theta(r)$ is the projection data.

In this example, the first set of reconstructed data M(x,y) may be obtained by conducting image reconstruction on the first set of projection data with the filtered back-projection algorithm, the direct back-projection algorithm, and/or the direct Fourier transform algorithm. Of course, the above three algorithms do not imply a limitation on the present disclosure; the skilled person in the art may also perform image reconstruction to the first set of projection data according to other reconstruction algorithms.

At block S103, a second set of projection data may be obtained by performing projection calculation with the first set of reconstructed data.

In this example, a second set of projection data $T_\theta(r)$ may be obtained by performing projection calculation according to the first set of reconstructed data, and a formula for the projection calculation may be as below:

$$T_\theta(r) = \iint M(x,y) \delta(x \cos \theta + y \sin \theta - r) dx dy \quad (6),$$

where, M(x,y) is the first set of reconstructed data, and the $\delta(x \cos \theta + y \sin \theta - r)$ is a Dirac delta function of a projection line with a projection angle of $\theta$, a distance from projection center (namely, an origin of a projection coordinate system) of r.

The second set of projection data may include a plurality of second projection data each corresponding to a respective projection angle of the plurality of projection angles. In some cases, for each projection angle of the plurality of projection angles, the second set of projection data includes respective second projection data. It is to be noted that the projection calculation formula of $T_\theta(r)$ does not imply a limitation on the present disclosure, and the skilled person in the art may also obtain the second set of projection data according to other formulas on projection of reconstructed data.

At block S104, a third set of projection data may be obtained by optimizing the first set of projection data based on a correlation between first projection data and second projection data corresponding to each projection angle. For example, for each projection angle, a correlation calculation may be performed on the respective first projection data and the respective second projection data corresponding to the projection angle. If the correlation between first projection data and second projection data corresponding to a certain projection angle fulfills a preset condition, e.g., a difference between the first projection data and the second projection data corresponding to the projection angle is larger than a preset threshold, the corresponding first projection data of this projection angle may be replaced with the second projection data to achieve optimization of the first set of projection data.

If the first projection data are neither missed nor damaged, the first projection data are identical to the second projection data obtained according to the first set of reconstructed data under an ideal projection condition and fulfill a sinusoidal fluctuation condition. However, if the first projection data are missed or damaged and do not fulfill the sinusoidal fluctuation condition, a difference may be caused between the first projection data and the second projection data. The so-called not fulfilling the sine condition means that the sine curve in FIG. 1C may not be able to form completely because a certain point or some points are missed, or a certain point or some points are not on the sine curve. However, the second set of projection data obtained by performing a projection calculation according to the first set of reconstructed data may fulfill the sinusoidal fluctuation condition, namely, the sine curve in FIG. 1C may be formed for the second set of projection data. Therefore, theoretically, when the first projection data are missed or damaged, the second set of projection data obtained by the projection of the first set of reconstructed data may be more approximate to the projection data obtained for the same subject under an ideal projection condition compared to the first set of projection data. If missed or damaged first projection data in the first set of projection data are replaced with the second projection data which is obtained from the first set of reconstructed data and more approximate to the projection data obtained under an ideal projection condition, the possibility that the first set of projection data fulfills the sinusoidal fluctuation condition may be greatly improved.

If a part of the first projection data is missed or damaged, a difference may be caused between first projection data without missing or damaging in the first set of projection data and corresponding second projection data in the second set of projection data obtained by a projection calculation, but the difference is much smaller compared to the missing or damaging part of the first projection data. To achieve reserving the original first projection data without missing or damaging and improving the first projection data missed or damaged, in this example, a correlation calculation may be performed on the first projection data and the second projection data corresponding to each projection angle. If a correlation between first projection data and second projection data corresponding to a certain projection angle fulfills a preset condition, e.g., a difference between the first projection data and the second projection data corresponding to the projection angle is larger, the first projection data may be considered to be missed or damaged projection data, and the first projection data corresponding to the projection angle may be replaced with the second projection data. If a correlation between first projection data and second projection data corresponding to a certain projection angle does not fulfill a preset condition, e.g., the difference between the first projection data and the second projection data corresponding to the projection angle is smaller, the first projection data may be considered as projection data without missing or damaging, and the first projection data may be reserved. In this way, a third set of projection data may be obtained.

In this example, the correlation calculation may be a calculation of correlation coefficient. The correlation coefficient is a statistical indicator that may reflect a level of intimacy of correlation among variables. Taking a Pearson's correlation coefficient as an example, the Pearson's correlation coefficient, also referred to as a simple correlation coefficient, may describe a degree of linear correlation between two variables. In this example, the correlation coefficient between first projection data and second projection data corresponding to the projection angle $\theta$ may be:

$$\mathrm{Corr} = \frac{N\sum_{r=1}^{N}(S_\theta(r)T_\theta(r)) - \sum_{r=1}^{N}S_\theta(r) * \sum_{r=1}^{N}T_\theta(r)}{\sqrt{N\sum_{r=1}^{N}(S_\theta(r))^2 - \left(\sum_{r=1}^{N}(S_\theta(r))\right)^2} * \sqrt{N\sum_{r=1}^{N}(T_\theta(r))^2 - \left(\sum_{r=1}^{N}(T_\theta(r))\right)^2}}, \quad (7)$$

where N is a total number of projection lines. Corr is the correlation coefficient, with its value in the range of [−1, 1]. If Corr is greater than 0, this indicates that the first projection data are positively correlated with the second projection data; if Corr is smaller than 0, this indicates that the first projection data are negatively correlated with the second projection data; and if Corr is identical to 0, this indicates that the first projection data is not correlated with the second projection data. The greater the absolute value of Corr is, the stronger the correlation is; and the smaller the absolute value of Corr is, the weaker the correlation is. In this example, the preset condition may be as below: if the correlation coefficient of first projection data and second projection data is no greater than (e.g., less than or equal to) a first threshold, it is considered that the difference between the first projection data and the second projection data is larger. Therefore, the first projection data corresponding to the projection angle may be replaced with the second projection data. The first threshold shall be greater than zero, in other words, if the correlation coefficient is positive and less than or equal to the first threshold, this may indicate that the first projection data are positively but weakly correlated with the second projection data. If the correlation coefficient is negative, this may indicate that the first projection data are negatively correlated with the second projection data. In both cases, it may be considered that the difference between the first projection data and the second projection data is larger. If the correlation coefficient of first projection data and second projection data is greater than the first threshold, it is considered that the difference between the first projection data and the second projection data is smaller. Therefore, the first projection data corresponding to the projection angle may be reserved.

In addition, the correlation calculation may also be a norm calculation. The so called norm is a function with a concept of "distance", a nonzero positive length or size endowed by all vectors in vector space.

In this example, a formula for determining the norm of the first projection data and the second projection data corresponding to the projection angle $\theta$ may be:

$$Lp_\theta = \frac{\left(\sum_{r=1}^{N}(|S_\theta(r) - T_\theta(r)|)^p\right)^{1/p}}{\left(\sum_{r=1}^{N}(|S_\theta(r)|)^p\right)^{1/p}}, \text{ or} \quad (8)$$

$$Lp_\theta = \left(\sum_{r=1}^{N}(|S_\theta(r) - T_\theta(r)|)^p\right)^{1/p}, \quad (9)$$

where $Lp_\theta$ is the norm corresponding to the projection angle $\theta$, p is the number of times of norm space, and N is the total number of projection lines. The greater the $Lp_\theta$ is, the farther the distance between the first projection data and the second projection data corresponding to the projection angle $\theta$ is, that is, the larger the difference between the first projection data and the second projection data is. The smaller the $Lp_\theta$ is, the nearer the distance between the first projection data and the second projection data corresponding to the projection angle $\theta$ is, that is, the smaller the difference between the first projection data and the second projection data is. The preset condition may be as below: the first projection data corresponding to the projection angle may be replaced with the second projection data when the norm is greater than or equal to a second threshold. If the norm is smaller than the second threshold, the first projection data may be reserved.

It should be understood that the above two methods for determining the correlation between the first projection data and the second projection data corresponding to the projection angle $\theta$ do not constitute a limitation on the present disclosure, and the skilled person in the art may also design other methods by themselves according to the actual situation.

At block S105, a second set of reconstructed data may be obtained by performing image reconstruction with the third set of projection data.

At block S106, an image may be generated according to the second set of reconstructed data to implement image reconstruction.

In an example, upon completion of block S104, image reconstruction may be performed on the third set of projection data with the filtered back-projection algorithm, the direct back-projection algorithm, or the direct Fourier transform algorithm, to obtain the second set of reconstructed data. Since the missing or damaging first projection data in the third set of projection data may be replaced by second projection data corresponding to the same projection angle, radial artifacts in the reconstructed image obtained according to the second set of reconstructed data may be reduced effectively, and a contrast may be improved effectively.

Figure 6:
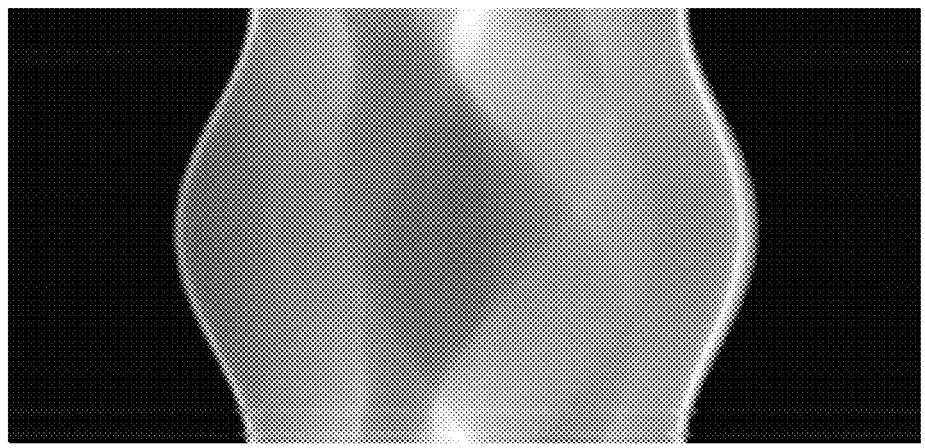
FIG. 6 is a projection diagram corresponding to the brain projection data of FIG. 3 according to one example of the present disclosure.
Figure 7:
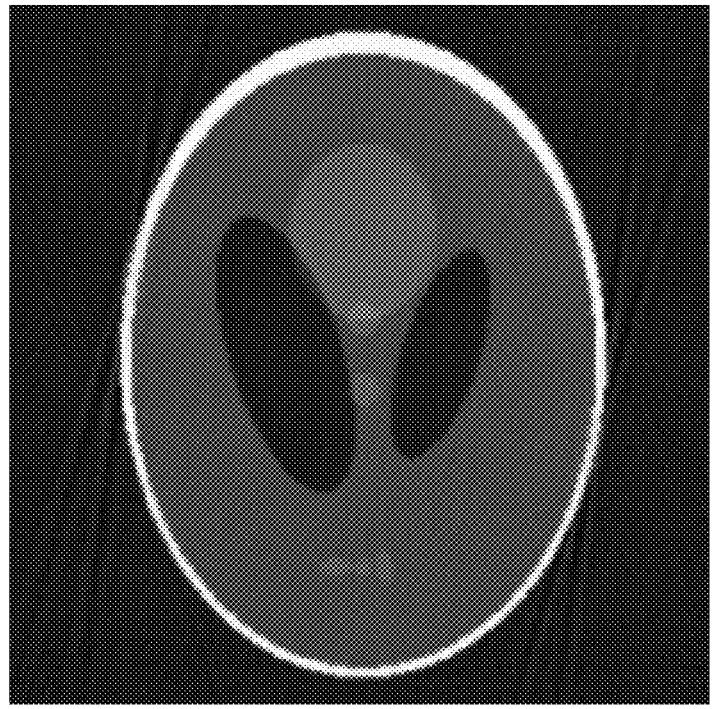
FIG. 7 is an image obtained by performing image reconstruction according to the brain projection data of FIG. 3 provided by one example of the present disclosure.

Taking projection data missing as an example, FIG. 6 is a projection data diagram obtained according to the third set of projection data, in which a complete image is shown without strips of black lines. FIG. 7 is an image generated according to the second set of reconstructed data obtained by reconstructing the third set of projection data corresponding to FIG. 6. Compared to FIG. 4, streak artifacts in the background of FIG. 7 are much reduced, and the contrast is higher. The reason that the radial artifacts in FIG. 7 are reduced but not completely disappeared may be as below: the third set of projection data is a combination of original projection data without missing or damaging and missing or damaging projection data after optimization, combination of the projection data may approximately but not completely conform to the sinusoidal fluctuation condition, and some errors may exist. Therefore, the streak artifacts in an image generated according to the second set of reconstructed data may be merely reduced but not completely disappeared.

Figure 8:
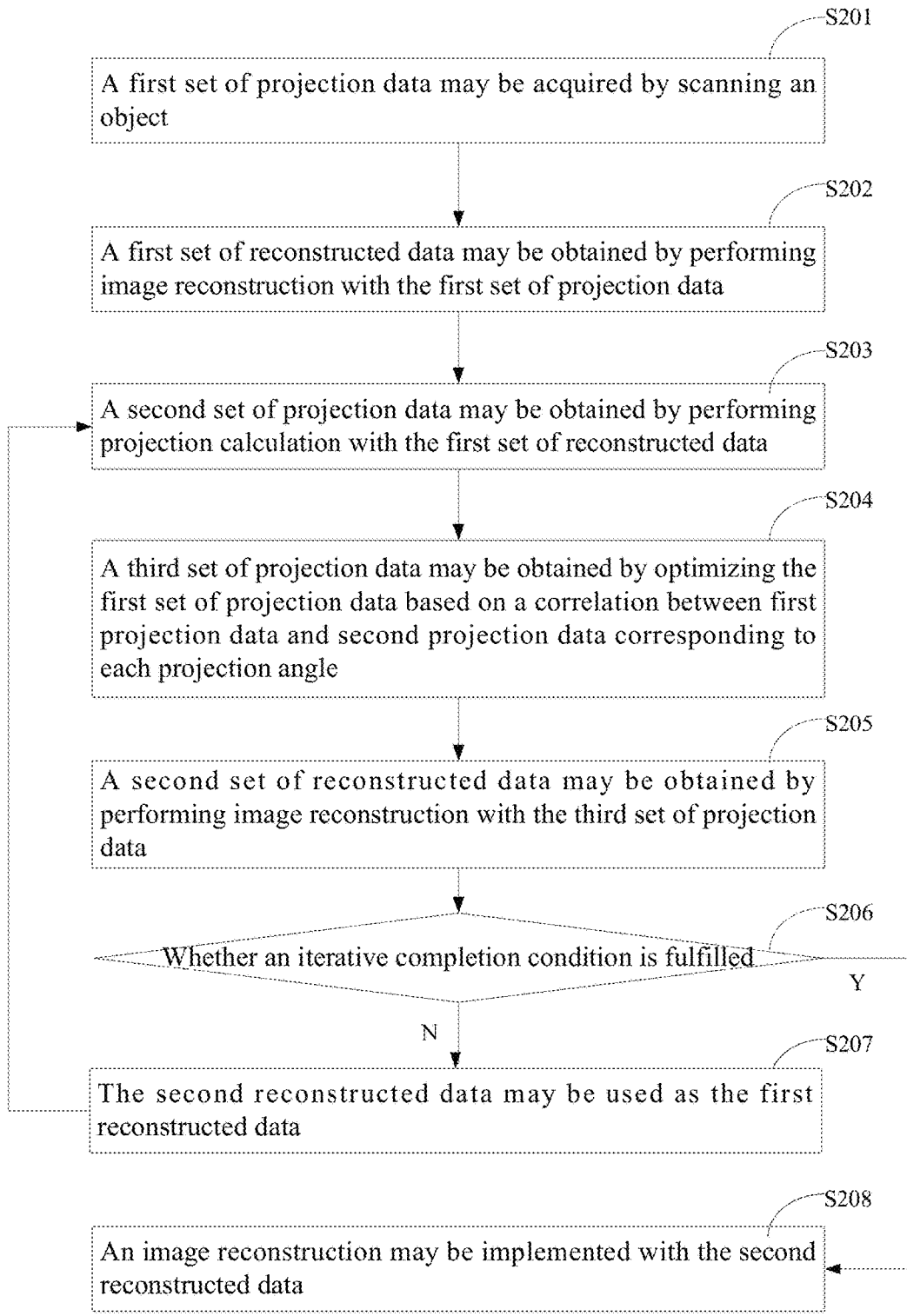
FIG. 8 is a flowchart of an image reconstruction method according to another example of the present disclosure.

FIG. 8 is a flowchart of an image reconstruction method according to another example of the present disclosure. As shown in FIG. 8, the image reconstruction method provided by this example may include the following blocks S201-S208.

At block S201, a first set of projection data may be acquired by scanning an object. The first set of projection data may include a plurality of first projection data each corresponding to a respective projection angle of a plurality of projection angles. In some cases, for each projection angle, the first set of projection data includes a respective first projection data.

At block S202, a first set of reconstructed data may be obtained by performing image reconstruction with the first set of projection data.

At block S203, a second set of projection data may be obtained by performing projection calculation with the first set of reconstructed data. The second set of projection data may include a plurality of second projection data each corresponding to a respective projection angle of the plurality of projection angles. In some cases, for each projection angle, the second set of projection data includes a respective second projection data.

At block S204, a third set of projection data may be obtained by optimizing the first set of projection data based on a correlation between first projection data and second projection data corresponding to each projection angle. For example, a correlation calculation may be respectively performed on the first projection data and the second projection data corresponding to each projection angle. If the correlation between first projection data and second projection data corresponding to a certain projection angle fulfills a preset condition, e.g., a difference between the first projection data and the second projection data is larger than a preset threshold, the first projection data corresponding to the projection angle may be replaced with the second projection data to optimize the first set of projection data, so as to obtain the third set of projection data.

At block S205, a second set of reconstructed data may be obtained by performing image reconstruction with the third set of projection data.

At block S206, determining whether an iterative completion condition is fulfilled, block S207 may be executed if the iterative completion condition is not fulfilled; otherwise, block S208 may be executed. As discussed in further details below, the iterative completion condition can include one of: a number of iterations reaching a preset value or a difference between a second set of reconstructed data obtained in a previous iteration and a second set of reconstructed data obtained in a current iteration being less than or equal to a preset value.

At block S207, the second set of reconstructed data obtained at block S205 may be used as the first set of reconstructed data at block S203, and return to block S203 to continue executing a next iteration.

In this example, to reduce more streak artifacts, projection, correlation calculation and reconstruction may be repeatedly performed on reconstructed data by way of iteration. Specifically, after obtaining the second set of reconstructed data, determining whether the second set of reconstructed data can be used or not to generate an image according to whether a predetermined iteration condition is fulfilled.

For example, if the predetermined iteration condition is not fulfilled, this indicates that the second set of reconstructed data may need to be further optimized. Thus, the second set of reconstructed data may be used as the new first set of reconstructed data at block S207, and return to block S203 to utilize the new first set of reconstructed data to carry out a projection calculation. In this way, a new second set of projection data may be obtained. In such a case, the new second set of projection data may include new second projection data corresponding to each projection angle.

It is to be noted that in this iteration, the new second set of projection data may be obtained by performing a projection calculation according to the new first set of reconstructed data (namely, the second set of reconstructed data obtained in a previous iteration), which may be different from the second set of projection data obtained by performing a projection calculation according to the original first set of reconstructed data in the previous iteration process. Afterwards, a correlation calculation may be performed on the first projection data and the new second projection data corresponding to each projection angle respectively, namely, block S204 is executed again. If the correlation between the first projection data and the new second projection data fulfills the preset condition, the first projection data corresponding to the projection angle may be replaced with the new second projection data to re-optimize the first set of projection data so as to obtain a new third set of projection data.

The re-optimized first set of projection data may be more approximate to an ideal sine curve than the first set of projection data optimized for the first time, thus making the quality of a reconstructed image better. Then, new second set of reconstructed data may be obtained by performing image reconstruction with the new third set of projection data.

After obtaining reconstructed data in each iteration, it is determined whether the iterative completion condition is fulfilled. Iteration may be stopped if the iterative completion condition is fulfilled, and an image may be generated by with the second set of reconstructed data obtained after the iteration. If the iterative completion condition is not fulfilled, iteration may be continued until the iteration condition is fulfilled. As the number of iterations increases, streak artifacts in obtained reconstructed image may be less and less, the contrast may be higher and higher, and the image quality may be better and better.

In some examples, the iteration condition includes reaching a preset number of iterations. In some examples, the iteration condition may be a difference between the second set of reconstructed data generated in this iteration and reconstructed data before optimization (e.g., the second set of reconstructed data generated in the previous iteration) being less than or equal to a preset limit value, as follows:

$$\varepsilon \geq \frac{\sqrt{\sum_{x,y}(|M^i(x, y) - M^{i-1}(x, y)|)^2}}{\sqrt{\sum_{x,y}(|M^i(x, y)|)^2}}, \quad (10)$$

where $M^i(x,y)$ is a second set of reconstructed data obtained in an $i^{th}$ iteration, and $M^{i-1}(x,y)$ is a second set of reconstructed data obtained in an $(i-1)^{th}$ iteration. In other words, iteration may be stopped if the difference between a reconstructed image obtained in the $i^{th}$ iteration and a reconstructed image obtained in the $(i-1)^{th}$ iteration is small enough. Of course, the two conditions do not constitute limitation on the present disclosure, and the skilled person in the art may also make a design according to actual demands.

At block S208, an image reconstruction may be implemented by generating an image with the second set of reconstructed data.

In this example, streak artifacts in the reconstructed image may be further reduced by looping iterations so that the quality of the reconstructed image may be improved effectively.

Based on the image reconstruction method according to the above examples, the present disclosure further provides an apparatus for image reconstruction, and the working principle thereof is described in detail with reference to the accompanying drawings in the following.

Figure 9:
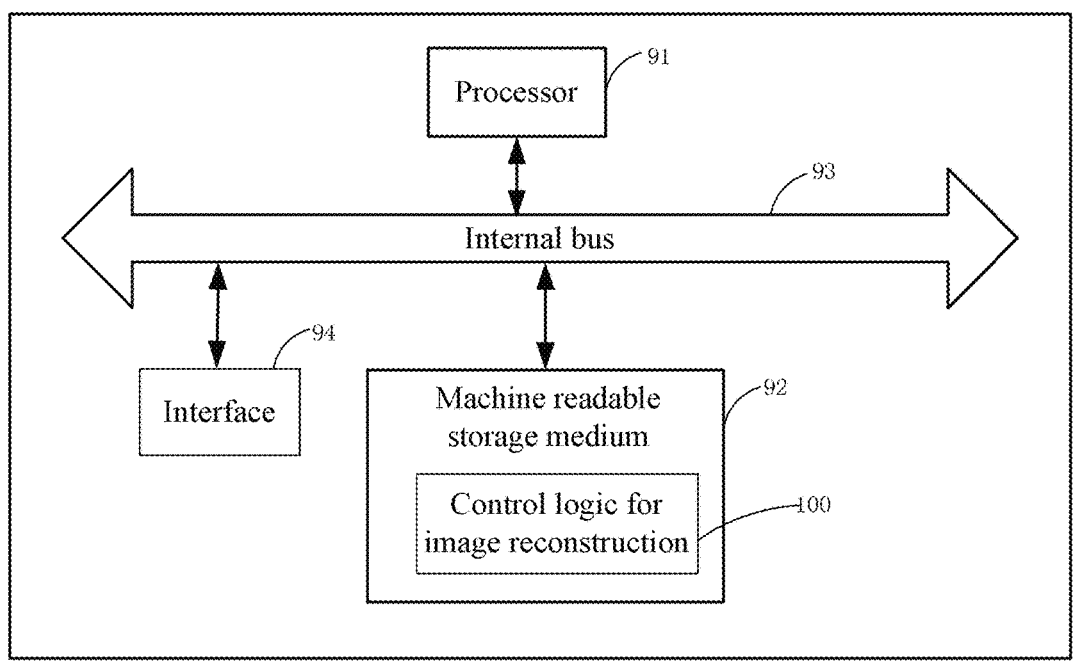
FIG. 9 is a schematic diagram of a hardware structure of an image reconstruction apparatus according to one example of the present disclosure.

Referring to FIG. 9, the apparatus may include a processor 91 and a machine-readable storage medium 92, which may be applied to a device of a projection system or any electronic device having a processor (particularly an image processor). The electronic device may include but not limited to: existing, being developed or to-be-developed desktop computers, laptop computers and mobile terminals (including smart mobile phones, non-smart phones, and various tablet computers), etc. The processor 91 and the machine-readable storage medium 92 generally may be interconnected via an internal bus 93. In other possible implementations, the apparatus may further include an interface 94 to enable to communicate with other devices or parts.

In different examples, the machine-readable storage medium 92 may be a random access memory (RAM), a volatile memory, a nonvolatile memory, a flash memory, a memory drive (such as a hard disk drive), a solid state drive, any type of memory disks (such as an optical disk or a DVD and so on), or a similar storage medium or a combination thereof.

Figure 10:
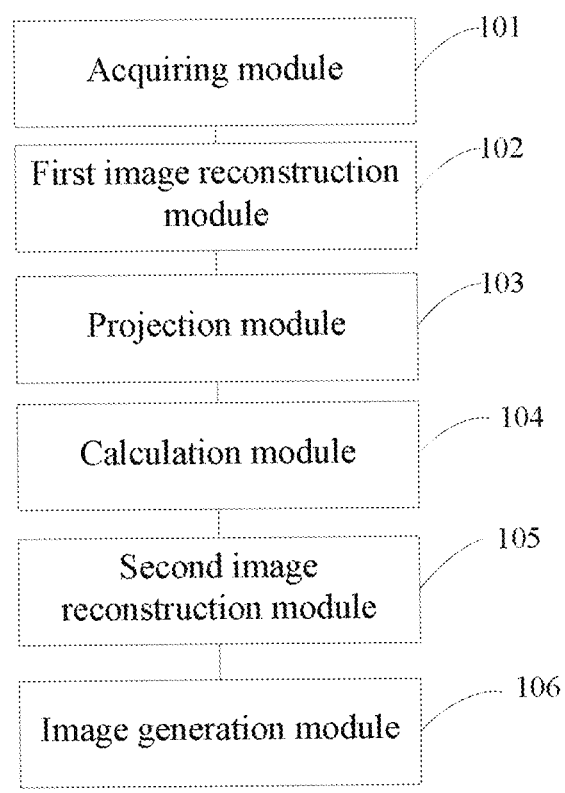
FIG. 10 is a functional module diagram of a control logic for image reconstruction according to one example of the present disclosure.

Further, the machine-readable storage medium 92 may store machine-executable instructions corresponding to a control logic for image reconstruction 100. Functionally divided, as shown in FIG. 10, the control logic for image reconstruction 100 may include an acquiring module 101, a first image reconstruction module 102, a projection module 103, a calculation module 104, a second image reconstruction module 105 and an image generation module 106.

The acquiring module 101 may be connected to the first image reconstruction module 102, the first image reconstruction module 102 may be connected to the projection module 103, the projection module 103 may be connected to the calculation module 104, the calculation module 104 may be connected to the second image reconstruction module 105, and the second image reconstruction module 105 may be connected to the image generation module 106.

The acquiring module 101 may be configured to acquire a first set of projection data obtained by scanning an object. The first set of projection data may include first projection data corresponding to each projection angle.

The first image reconstruction module 102 may be configured to perform image reconstruction with the first set of projection data to obtain first set of reconstructed data.

The projection module 103 may be configured to perform projection calculation according to the first set of reconstructed data to obtain a second set of projection data. The second set of projection data may include second projection data corresponding to each projection angle.

The calculation module 104 may be configured to perform correlation calculation on the first projection data and the second projection data corresponding to each projection angle. If a correlation between first projection data and second projection data corresponding to a certain projection angle fulfills a preset condition, the first projection data corresponding to the projection angle may be replaced with the second projection data to achieve an optimization of the first set of projection data, so as to obtain a third set of projection data.

In a possible implementation, the calculation module 104 may be specifically configured to: determine a correlation coefficient between the first projection data and the second projection data corresponding to each projection angle; and replace the first projection data corresponding to the projection angle with the second projection data if the numerical value of the correlation coefficient is less than or equal to a first threshold.

In another possible implementation, the calculation module 104 may be specifically configured to: calculate a norm between the first projection data and the second projection data corresponding to each projection angle; and replace the first projection data corresponding to the projection angle with the second projection data if the norm is greater than or equal to a second threshold.

The above two possible implementations do not constitute limitation on the present disclosure, and the skilled person in the art may also design by themselves according to actual conditions.

The second image reconstruction module 105 may be configured to perform image reconstruction with the third set of projection data to obtain second set of reconstructed data.

The image generation module 106 may be configured to generate an image according to the second set of reconstructed data to implement image reconstruction.

In this example, image reconstruction may be performed with the first set of projection data obtained by scanning an object to obtain a first set of reconstructed data. Afterwards, projection calculation may be performed according to the first set of reconstructed data to obtain a second set of projection data. Then, a correlation calculation may be performed on the first projection data and the second projection data corresponding to each projection angle. If a correlation between first projection data and second projection data corresponding to a certain projection angle fulfills a preset condition, e.g., a difference between the first projection data and the second projection data corresponding to the projection angle is larger, the first projection data may be considered to be missing or damaging projection data, and the first projection data may be replaced with the second projection data. Since the second projection data may fulfill a sine condition better than the first projection data, optimization of the first set of projection data may be implemented through the above replacement, thereby obtaining a third set of projection data. After performing correlation calculation on all projection angles, image reconstruction may be performed with the third set of projection data to obtain a second set of reconstructed data. Compared with an image obtained by performing image reconstruction with the first set of projection data, an image generated with the second set of reconstructed data may reduce streak artifacts effectively, thereby improving the image quality.

Figure 11:
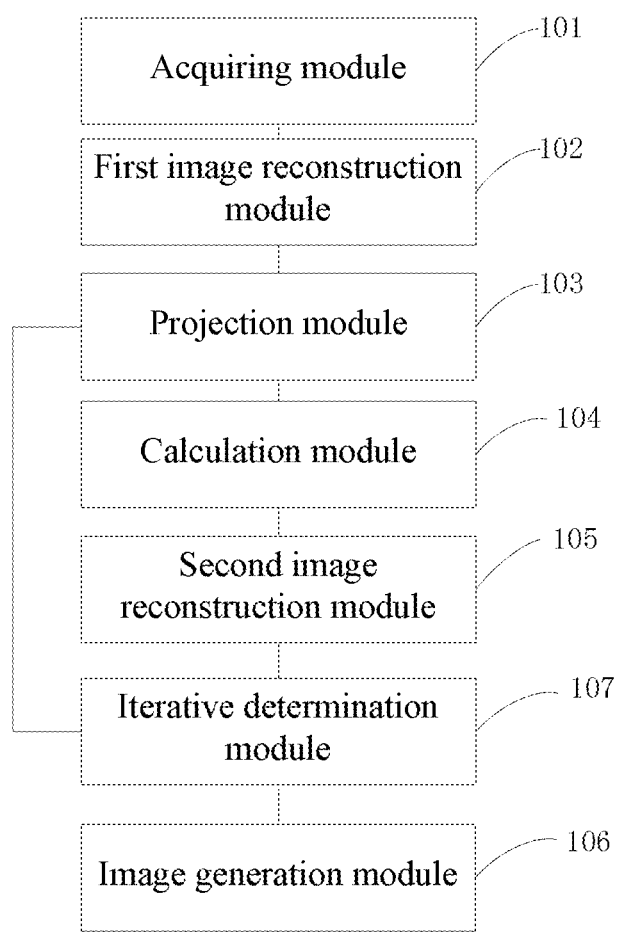
FIG. 11 is a functional module diagram of a control logic for image reconstruction according to another example of the present disclosure.

Further, functionally divided, as shown in FIG. 11, the control logic 100 may further include an iterative determination module 107. The iterative determination module 107 may be connected to the second image reconstruction module 105 and the projection module 103 respectively, and used to determine whether an iterative completion condition is fulfilled. If a determination result by the iterative determination module 107 is negative, the second set of reconstructed data may be sent as new first set of reconstructed data to the projection module 103 for iteration, and the projection module 103 is activated to generate a new set of projection data. If a determination result of the iterative determination module 107 is positive, the image generation module 106 may be activated.

The iterative completion conditions may include: numbers of iterations reaching a preset threshold, or the difference between the second set of reconstructed data obtained in previous iteration and second set of reconstructed data obtained in current iteration being less than or equal to a preset limit.

In such a case, the projection module 103 may be further configured to perform projection calculation according to the new first set of reconstructed data to obtain a new second set of projection data. The image generation module 106 may be configured specifically to generate an image according to the second set of reconstructed data obtained after completion of the iteration, so as to implement image reconstruction.

In this example, the quality of the reconstructed image may be further improved by looping iteration.

When the function of the logic instructions corresponding to the image reconstruction method is implemented in the form of a software functional unit and is sold or used as an independent product, the instructions may be stored in a computer-readable storage medium. Based on such understanding, the technical solution of the present disclosure in essence or that part of contribution to the prior art or a part of the technical solution may be embodied in the form of software products. The software products may be stored in a storage medium, comprising some instructions to cause a computer device (a personal computer, a server or a network device and so on) to execute all or a part of blocks of the method as recited in the examples of the present disclosure. The aforementioned storage medium may include: a USB flash disk, a mobile hard disk, a read-only memory (ROM), a random access memory (RAM), a magnetic disk or an optical disk and other medium capable of storing a program code.

Taking software implementation as an example, the following further describes how to execute the control logic 100 by the image reconstruction apparatus. In this example, the control logic 100 in the present disclosure may be interpreted as machine executable instructions stored in the machine-readable storage medium 92. When the processor 91 on the image reconstruction apparatus of the present disclosure executes the machine executable instructions corresponding to the control logic 100, by invoking the machine executable instructions stored on the machine readable storage medium 92, the processor 91 may be caused to:

acquire a first set of projection data by scanning an object, wherein the first set of projection data comprises first projection data corresponding to each projection angle;

obtain a first set of reconstructed data by performing image reconstruction with the first set of projection data;

obtain a second set of projection data by performing projection calculation with the first set of reconstructed data, wherein the second set of projection data comprising second projection data corresponding to each projection angle;

obtain a third set of projection data by optimizing the first set of projection data based on a correlation between the first projection data and the second projection data corresponding to each projection angle;

obtain a second set of projection data by performing image reconstruction with the third set of projection data; and generate a reconstructed image according to the second set of reconstructed data.

According to an example, when obtain a third set of projection data by optimizing the first set of projection data based on a correlation between the first projection data and the second projection data corresponding to each projection angle, the machine executable instructions cause the processor 91 to:

determine a correlation coefficient between the first projection data and the second projection data corresponding to each projection angle;

take the second projection data corresponding to a projection angle as projection data corresponding to the projection angle in the third set of projection data, under the condition the correlation coefficient between the first projection data and the second projection data corresponding to the projection angle is less than or equal to a first threshold;

take the first projection data corresponding to a certain projection angle as projection data corresponding to the projection angle in the third set of projection data, under the condition the correlation coefficient between the first projection data and the second projection data corresponding to the projection angle is greater than the first threshold.

According to another example, when obtaining a third set of projection data by optimizing the first set of projection data based on a correlation between the first projection data and the second projection data corresponding to each projection angle, the machine-executable instructions cause the processor 91 to:

determine a norm between the first projection data and the second projection data corresponding to each projection angle;

take the second projection data corresponding to a projection angle as projection data corresponding to the projection angle in the third set of projection data, under the condition the norm between the first projection data and the second projection data corresponding to the projection angle is greater than or equal to a second threshold;

take the first projection data corresponding to a certain projection angle as projection data corresponding to the projection angle in the third set of projection data, under the condition the norm between the first projection data and the second projection data corresponding to the projection angle is smaller than the second threshold.

According to an example of the present disclosure, before generating a reconstructed image according to the second set of reconstructed data, the machine executable instructions further cause the processor 91 to determine whether the preset iterative completion condition is fulfilled. The second set of reconstructed data may be taken as new first set of reconstructed data if the iterative completion condition is not fulfilled, and projection calculation may be performed again according to the new first set of reconstructed data to implement iteration. A reconstructed image may be generated according to the second set of reconstructed data if the iterative completion condition is fulfilled.

The iterative completion condition may include any one or more of following conditions: number of iterations reaching a preset value, and the difference between the second set of reconstructed data obtained in previous iteration and second set of reconstructed data obtained in current iteration being less than or equal to the preset value.

In addition, when performing image reconstruction on the first set of projection data, the machine executable instructions may cause the processor 91 to perform image reconstruction on the first set of projection data according to any one of a filtered back-projection algorithm, a direct back-projection algorithm and a direct Fourier transform algorithm.

Similarly, when performing image reconstruction by with the third set of projection data, the machine executable instructions may cause the processor 91 to perform image reconstruction on the third set of projection data according to any one of a filtered back-projection algorithm, a direct back-projection algorithm and a direct Fourier transform algorithm.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the above description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Accordingly, other embodiments are within the scope of the following claims.

The invention claimed is:

1. A method of reconstructing image, comprising:
   accessing a first set of projection data that comprises a plurality of first projection data each corresponding to a respective projection angle of a plurality of projection angles;
   generating a first set of reconstructed data by image reconstruction with the first set of projection data;
   generating a second set of projection data by projection calculation with the first set of reconstructed data, the second set of projection data comprising a plurality of second projection data each corresponding to a respective projection angle of the plurality of projection angles;
   generating a third set of projection data by optimizing the first set of projection data based on a correlation between respective first projection data and respective second projection data corresponding to each of the plurality of projection angles; and
   generating a second set of reconstructed data by image reconstruction with the third set of projection data.

2. The method according to claim 1, wherein generating the third set of projection data comprises:
   determining a correlation coefficient between respective first projection data and respective second projection data corresponding to each of the plurality of projection angles;
   in response to determining that a correlation coefficient between first projection data and second projection data corresponding to a projection angle is no greater than a first threshold, taking the second projection data corresponding to the projection angle as projection data corresponding to the projection angle in the third set of projection data; and in response to determining that a correlation coefficient between first projection data and second projection data corresponding to a projection angle is greater than the first threshold, taking the first projection data corresponding to the projection angle as projection data corresponding to the projection angle in the third set of projection data.

3. The method according to claim 1, wherein generating the third set of projection data comprises:
determining a norm between respective first projection data and respective second projection data corresponding to each of the plurality of projection angles;
in response to determining that a norm between first projection data and second projection data corresponding to a projection angle is no smaller than a second threshold, taking the second projection data corresponding to the projection angle as projection data corresponding to the projection angle in the third set of projection data; and
in response to determining that a norm between first projection data and second projection data corresponding to a projection angle is smaller than the second threshold, taking the first projection data corresponding to the projection angle as projection data corresponding to the projection angle in the third set of projection data.

4. The method according to claim 1, further comprising:
generating a reconstructed image according to the second set of reconstructed data.

5. The method according to claim 1, further comprising:
determining whether an iterative completion condition is fulfilled;
if the iterative completion condition is not fulfilled, taking the second set of reconstructed data as a new first set of reconstructed data and generating a new second set of reconstructed data based on the new first set of reconstructed data; and
if the iterative completion condition is fulfilled, generating a reconstructed image according to the second set of reconstructed data.

6. The method according to claim 5, wherein the iterative completion condition comprises at least one of:
a number of iterations reaching a preset value, or
a difference between a second set of reconstructed data obtained in a previous iteration and a second set of reconstructed data obtained in a current iteration being no more than a preset value.

7. The method according to claim 1, wherein image reconstruction with the first set of projection data comprises:
reconstructing image data with the first set of projection data according to at least one of a filtered back-projection algorithm, a direct back-projection algorithm, or a direct Fourier transform algorithm, the reconstructed image data comprising the first set of reconstructed data.

8. The method according to claim 1, wherein image reconstruction with the third set of projection data comprises:
reconstructing image data with the third set of projection data according to at least one of a filtered back-projection algorithm, a direct back-projection algorithm, or a direct Fourier transform algorithm, the reconstructed image data comprising the second set of reconstructed data.

9. The method according to claim 1, further comprising:
acquiring the first set of projection data by scanning an object.

10. An apparatus for reconstructing image, comprising:
a processor; and
a machine readable storage medium storing machine executable instructions that correspond to a control logic for image reconstruction and upon such execution cause the processor to:
access a first set of projection data that comprises a plurality of first projection data each corresponding to a respective projection angle of a plurality of projection angles;
generate a first set of reconstructed data by image reconstruction with the first set of projection data;
generate a second set of projection data by projection calculation with the first set of reconstructed data, the second set of projection data comprising a plurality of second projection data each corresponding to a respective projection angle of the plurality of projection angles;
generate a third set of projection data by optimizing the first set of projection data based on a correlation between respective first projection data and respective second projection data corresponding to each of the plurality of projection angles; and
generate a second set of reconstructed data by image reconstruction with the third set of projection data.

11. The apparatus according to claim 10, wherein the machine-executable instructions cause the processor to generate the third set of projection data by:
determining a correlation coefficient between respective first projection data and respective second projection data corresponding to each of the plurality of projection angles;
in response to determining that a correlation coefficient between first projection data and second projection data corresponding to a projection angle is no greater than a first threshold, taking the second projection data corresponding to the projection angle as projection data corresponding to the projection angle in the third set of projection data; and
in response to determining that a correlation coefficient between first projection data and second projection data corresponding to a projection angle is greater than a first threshold, taking the first projection data corresponding to the projection angle as projection data corresponding to the projection angle in the third set of projection data.

12. The apparatus according to claim 10, wherein the machine-executable instructions cause the processor to generate the third set of projection data by:
determining a norm between respective first projection data and respective second projection data corresponding to each of the plurality of projection angles;
in response to determining that a norm between first projection data and second projection data corresponding to a projection angle is no smaller than a second threshold, taking the second projection data corresponding to the projection angle as projection data corresponding to the projection angle in the third set of projection data; and
in response to determining that a norm between first projection data and second projection data corresponding to a projection angle is smaller than the second threshold, taking the first projection data corresponding to the projection angle as projection data corresponding to the projection angle in the third set of projection data.

13. The apparatus according to claim 10, wherein the machine executable instructions further cause the processor to:
generate a reconstructed image according to the second set of reconstructed data.

14. The apparatus according to claim 10, wherein the machine executable instructions further cause the processor to:
determine whether an iterative completion condition is fulfilled;
if the iterative completion condition is not fulfilled, take the second set of reconstructed data as a new first set of reconstructed data and generate a new second set of reconstructed data based on the new first set of reconstructed data; and
if the iterative completion condition is fulfilled, generate a reconstructed image according to the second set of reconstructed data.

15. The apparatus according to claim 14, wherein the iterative completion condition comprises at least one of:
a number of iterations reaching a preset value, or
a difference between a second set of reconstructed data obtained in a previous iteration and a second set of reconstructed data obtained in a current iteration being no more than a preset value.

16. The apparatus according to claim 10, wherein the machine executable instructions cause the processor to:
perform the image reconstruction on the first set of projection data with at least one of a filtered back-projection algorithm, a direct back-projection algorithm, or a direct Fourier transform algorithm.

17. The apparatus according to claim 10, wherein the machine-executable instructions cause the processor to:
perform the image reconstruction on the third set of projection data with at least one of a filtered back-projection algorithm, a direct back-projection algorithm, or a direct Fourier transform algorithm.

18. The apparatus according to claim 10, wherein the machine executable instructions further cause the processor to:
acquire the first set of projection data by scanning an object.

19. A non-transitory computer readable storage medium storing instructions that are executable by a processor and upon such execution cause the processor to:
access a first set of projection data that comprises a plurality of first projection data each corresponding to a respective projection angle of a plurality of projection angles;
generate a first set of reconstructed data by image reconstruction with the first set of projection data;
generate a second set of projection data by projection calculation with the first set of reconstructed data, the second set of projection data comprising a plurality of second projection data each corresponding to a respective projection angle of the plurality of projection angles;
generate a third set of projection data by optimizing the first set of projection data based on a correlation between respective first projection data and respective second projection data corresponding to each of the plurality of projection angles; and
generate a second set of reconstructed data by image reconstruction with the third set of projection data.

20. The non-transitory computer readable storage medium according to claim 19, wherein the machine executable instructions further cause the processor to:
generate a reconstructed image according to the second set of reconstructed data.

* * * * *